United States Patent [19]

Hardy

[11] 3,973,666

[45] Aug. 10, 1976

[54] WARE ORIENTATION OR TRANSFER APPARATUS

[75] Inventor: Donald F. Hardy, Horseheads, N.Y.

[73] Assignee: Dart Industries Inc., Los Angeles, Calif.

[22] Filed: Apr. 9, 1975

[21] Appl. No.: 566,482

Related U.S. Application Data

[63] Continuation-in-part of Ser. No. 374,298, June 28, 1973, Pat. No. 3,886,891.

[52] U.S. Cl. .............................. 198/24; 198/31 AA; 198/221
[51] Int. Cl.² ......................................... B65G 47/26
[58] Field of Search ............. 198/24, 29, 30, 31 AA, 198/31 AB, 165, 167, 175, 221, 222, 223

[56] References Cited
UNITED STATES PATENTS

| | | | |
|---|---|---|---|
| 1,968,501 | 7/1934 | Morton et al. .................. | 198/31 AA |
| 2,001,332 | 5/1935 | Ross .............................. | 198/31 AA |
| 2,704,592 | 3/1955 | Hoppe ................................ | 198/24 |
| 2,795,317 | 6/1957 | Borrowdale......................... | 198/167 |
| 2,818,157 | 12/1957 | Howell ........................... | 198/31 AA |
| 2,834,388 | 5/1958 | Meyer............................... | 198/24 X |
| 3,040,867 | 6/1962 | Posten et al. ...................... | 198/24 X |
| 3,308,922 | 3/1967 | Ellis et al. .............................. | 198/30 |
| 3,381,793 | 5/1968 | Booth ............................ | 198/221 X |
| 3,662,871 | 5/1972 | Koepnick............................. | 198/30 |

*Primary Examiner*—John J. Love
*Assistant Examiner*—Richard K. Thomson
*Attorney, Agent, or Firm*—Leigh B. Taylor; Paul R. Wylie; Kenneth J. Hovet

[57] ABSTRACT

An orientation or transfer device that is adaptable to either accurately align a plurality of articles of glassware simultaneously on a conveyor and on centers that may be easily adjusted to accommodate the users needs or to move a single row of such ware from one conveyor system to another.

The device is particularly well adapted for inclusion in a glassware coating system that is continuously operable to apply a coating of thermo-plastic polymer resin to the exterior surface of the ware. However, the device is easily modified to form transfer apparatus that will efficiently move ware from a stacked arrangement on a conveyor across a dead plate to a single line conveyor.

4 Claims, 6 Drawing Figures

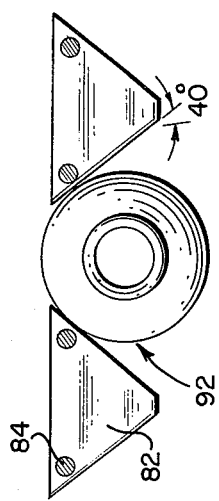
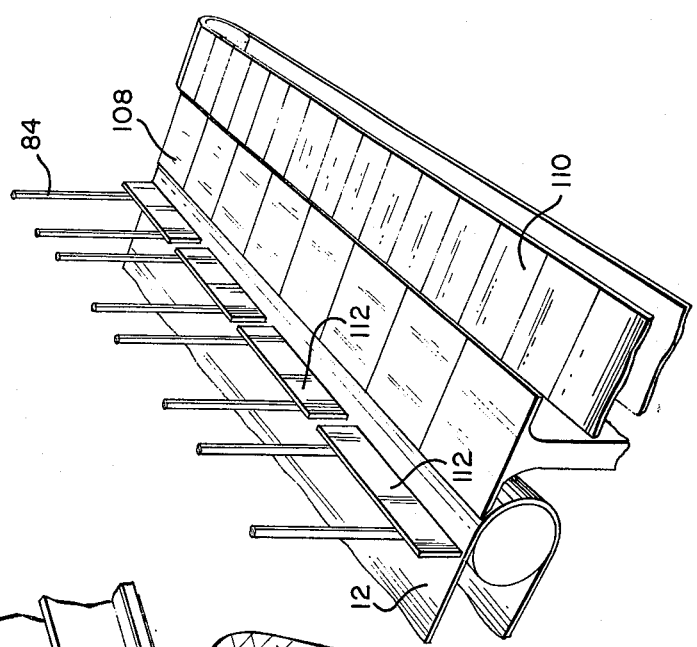
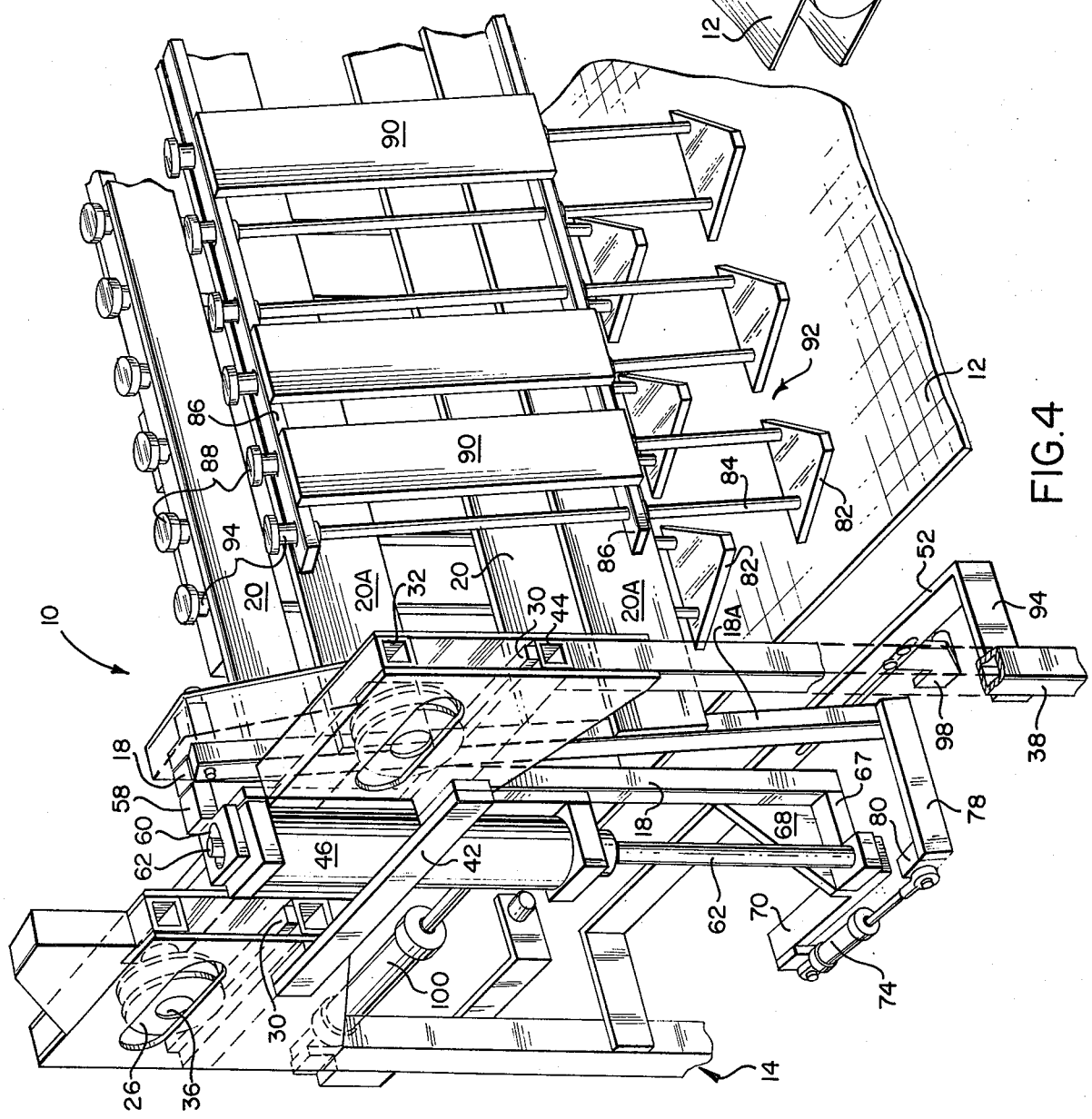

WARE ORIENTATION OR TRANSFER APPARATUS

CROSS-REFERENCE TO RELATED APPLICATIONS

This is a continuation-in-part application of my earlier filing entitled, Fluidized Bed Coating Apparatus and Process, Ser. No. 374,298, filed June 28, 1973 now U.S. Pat. No. 3,886,891.

This invention relates to an improved apparatus for orienting or transferring articles of manufacture and more particularly concerns the production of shatter-resistant glassware (i.e., bottleware). The coating process for such shatter-resistant ware employs particulate resins and requires the careful control on glassware preheat and curing temperatures, immersion times and the like to assure production of a properly adherent coating. One preferred method is the application of the polymer coating to the ware using fluidized bed techniques which, in conjunction with the heating, etc., referred to, may be operated as a continuous line, optionally in concert with typical bottle forming machinery.

Particular apparatus developments and improvements have contributed to the success of this overall process and coated "shatter-resistant" bottle product. Unique ware orientation assemblies are employed to present the ware to the coating medium. In the environment mentioned it is a critical aspect in the successful operation of the system to effectively and efficiently transfer ware through and between the various process stages encompassed thereby. The ware orienter and transfer device described herein is therefore critical in both respects in that stacked ware moving with wide conveyors through ovens or the like invariably becomes misaligned due to belt slippage or stretching. Accordingly, if alignment is critical to the transfer of same, as it is in the system referred to here, realignment must be effected.

Likewise, it is obvious that by stacking ware closer on conveyors in systems of this type higher production rates can be achieved. Furthermore, the efficient transfer of ware between conveyors of different types in this same kind of system may be critical to assure that all ware is handled in like fashion and without significant variance in dwell time between various operations.

Accordingly, it is a primary objective of this invention to provide apparatus for reorienting ware into precise alignment and position which is capable of:
1. handling a wide variety of ware sizes;
2. being preset to reorient on various fixed center distances;
3. respacing ware from one longitudinal center distance to another;
4. being positionable between closely stacked ware on a conveyor; and
5. modification to a transfer device that moves ware from one conveyor to another.

Precision reorientation of ware on a conveyor at various preselected longitudinal center distances is accomplished by this apparatus. Two sets of push rod racks, one stationary and one pivoted adjacent its upper extremity are mounted on a support structure. Each rack consists of a series of vertical push rods with push plates mounted on the lower ends. The pivoted rack may be adjusted relative to the stationary rack and secured to give various preselected longitudinal center distances. Or, if desired, the pivoted rack may be driven by fluid cylinders so as to reorient ware from an incoming longitudinal center distance to a greater longitudinal center distance during reorientation. The apparatus head containing the racks is mounted on a longitudinally traversing trolley and rail system. Upon signal from a photocell system the apparatus head is driven vertically downward by fluid cylinders causing the push rods and push plates to fall behind moving rows of ware. The head and trolley assembly is then driven forward by additional fluid cylinders, whereby the push plates gather ware into pockets as the ware is pushed a few inches ahead on the conveyor belt. The head then retracts vertically upward clearing the tops of the ware and then moves horizontally backward to its point of initiation. The push plates are designed more or less in a triangular or trapezoidal shape and drive between ware as it is oriented. These push plates are capable, if necessary, of dropping between rows of ware which are abutted together longitudinally.

The push rods on which the push plates are mounted are guided by bushings so that in the event a push plate lowers on fallen or severely misplaced ware, the plate lifts, relieving any undue strain and allows the remainder of the plates to work in a normal manner. Groups of ware leaving the orienter have consistently spaced straight rows and are precisely oriented for further processing and/or transfer.

The ware orienter may also be used as a conveyor unloader. By removing the stationary pusher rack and by replacing the special orienting push plates with straight flat segmented push bars on the pivoted rack, ware may be removed from a wide conveyor, across dead plates, and onto a single line conveyor operating at right angles to the wide conveyor.

Additional objectives and advantages not enumerated will, however, also become more apparent upon continued reference to the specification, claims and drawing wherein:

FIG. 4 is a top perspective view showing the operative interconnective features between the frame, support structure and pusher units;

FIG. 5 is a partial top plan view of the ware pusher units illustrating the engagement of such with the ware; and FIG. 6 is in another embodiment a partial top perspective view of the pusher units of a ware transfer device.

Figure 2:
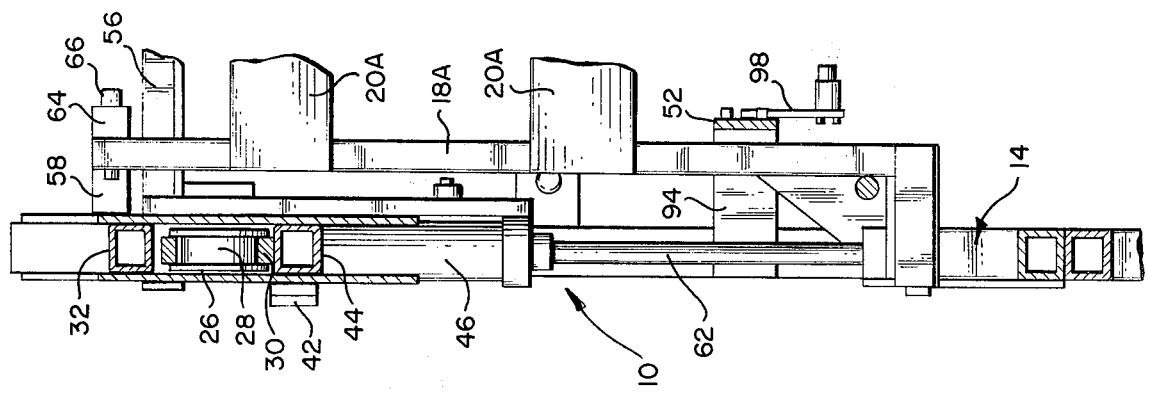
FIG. 2 is a partial front elevational view showing the frame and support structure therefor.

The basic process steps for the application of a "shatter-resistant" coating to bottleware includes a preheat cycle, a particulate coating application and a coating curing or fusing procedure. The overall apparatus arrangement or combination used in effectuation of the indicated process may include:
1. a bare bottle uncaser, a box conveyor and a coated bottle caser;
2. a single line bottle primer preheat oven, a prime spray or coating unit and a pushbar stacker;
3. a polymer coating preheat oven and conveyor, a fluidized bed and bottle transfer or dipping mechanism, and curing oven and conveyor, and 4. cooling section, waxer, flame sensitizer and automatic inspection station.

Immediately adjacent the terminal end of preheat oven (not shown) is an article orientation mechanism 10 positioned across conveyor 12. The orientation mechanism 10 aligns the bottles both longitudinally and transversely of the path of travel of conveyor 12 and thereby prepositions same for engagement by transfer apparatus (not shown).

The bottle or article orientation mechanism 10 extends across and above the conveyor 12 and is in relatively close proximity to both the exit of the preheat oven (not shown) and the pick-up point of the fluidized bed and transfer apparatus (not shown). Accordingly, as heated bottleware exits the preheat oven it is engaged by the orientation mechanism 10 and one or more rows of bottles are realigned on conveyor 12 so that they can be properly grasped at the mentioned pick-up point.

The orientation mechanism 10 includes a frame 14 that is affixed either to the conveyor 12, to others of the associated apparatus fixtures or may be free standing as here contemplated to be the preferred arrangement. A movable support structure 16 is positioned within such frame and includes end members 18 and cross pieces 20.

Figure 3:
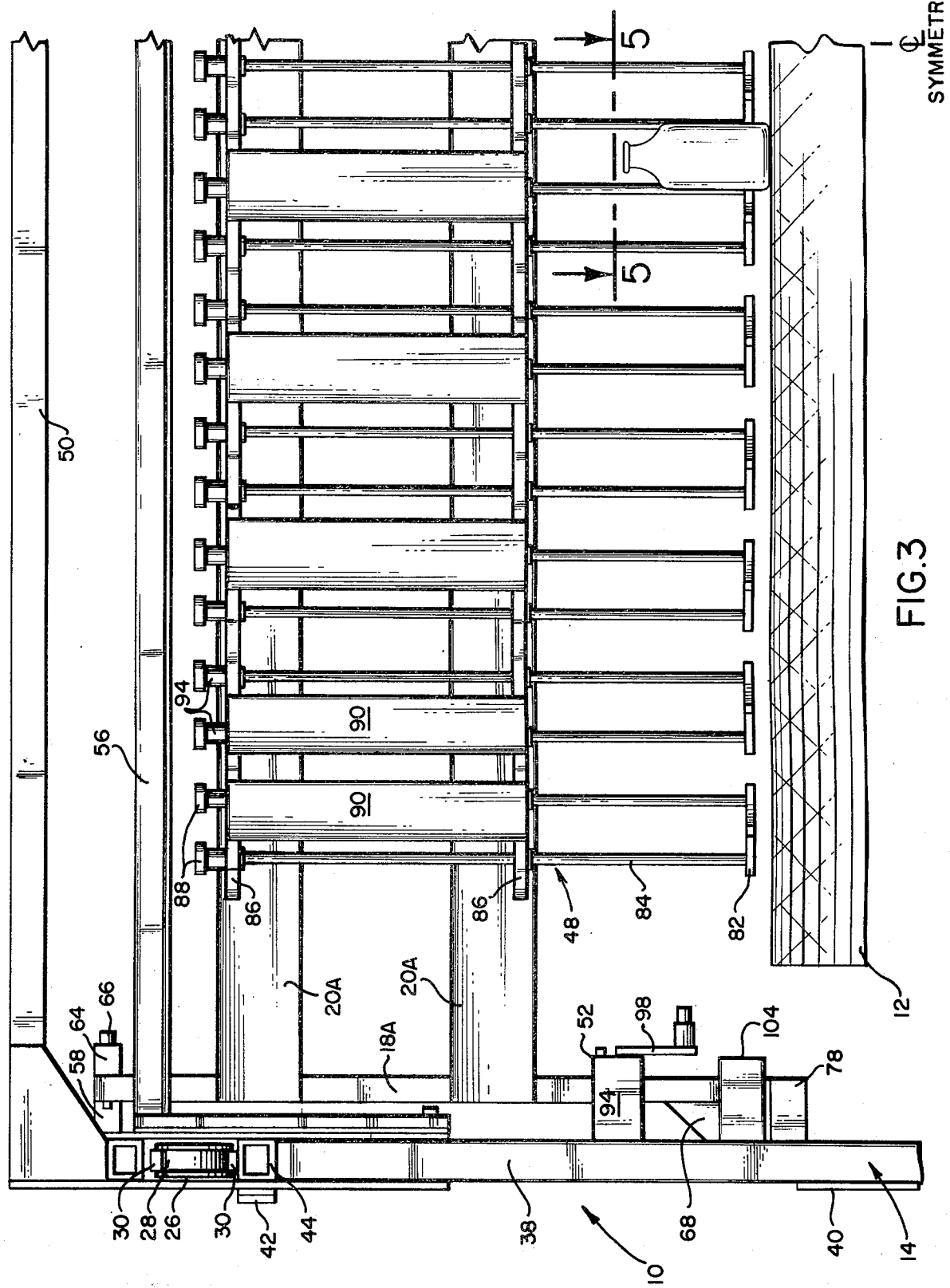
FIG. 3 is also a partial front elevational view showing additional of the support structure and the pusher units.

As can be seen in FIG. 3 these members 18 and pieces 20 are suitably affixed to one another by cap screws or other similar fastening means and are additionally mounted upon opposed trolley members 24 which members are supported on the frame by means of wheels 26. The wheels 26 are channeled as at 28 and ride on rail members 30 that are mounted to frame pieces 32. Frame pieces 32 have longitudinal slots 34 in them to accommodate and expose axles 36 of the support structure 16, thus making alterations, repairs and maintenance of the system as simple as possible.

Figure 1:
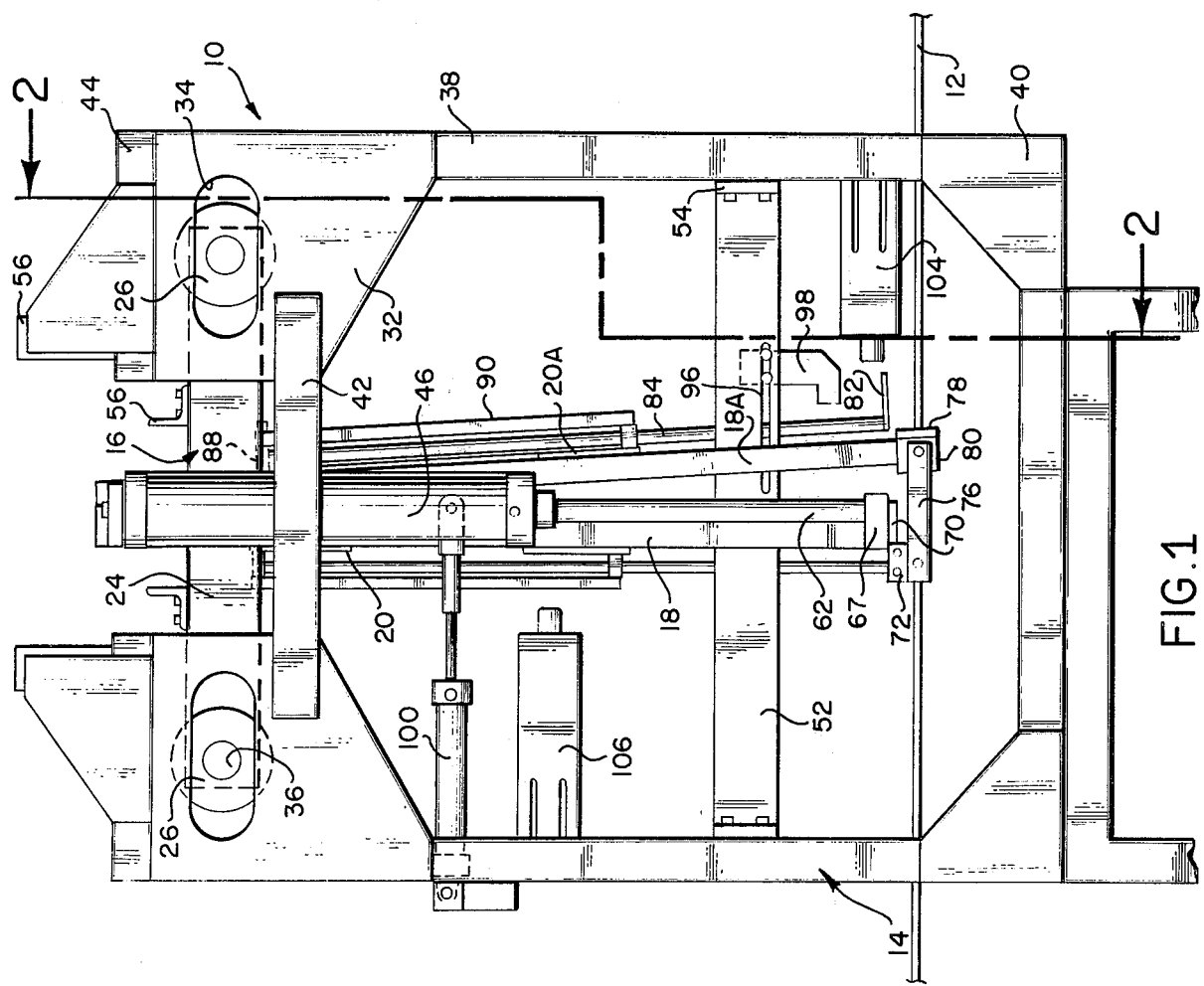
FIG. 1 is a side elevational view of the ware orientation and/or transfer apparatus.

With further reference to FIG. 1 it is apparent that the frame 14 is made up of a plurality of tubular members 38 suitably interconnected by means of gusset plates 40 and offset bars 42. The offset bars afford for the continuity of tubular members 44 yet accommodate for the presence of actuating means 46 along the approximate center line of such members. This minimizes the bending moment that the weight of the support structure 16 and pusher units 48 will apply to the axles and wheels of such structure. The bending moment effect might also be further minimized if one chose to include additional trolley members 24 exterior of frame pieces 32 and suitably interconnect same with axles 36 and actuating means 46. This alternative, of course, will be dictated by various design criteria that would be obvious to one skilled in the art.

The frame is further rigidified by transverse tubular members 50 extending above and across the conveyor 12 as well as other similar such members (not shown) extending beneath the conveyor. Likewise, support plates 52 attached to members 38 by means of connectors 54 also lend further support to the frame as a whole. This plate, however, also functions in a manner described below in more detail.

The support structure 16, as indicated above, includes axle 36 and wheel 26 arrangements to which are mounted trolley members 24. Such members and arrangements are positioned along each side of the conveyor 12 and on the frame as described above. Furthermore, these members are interconnected by at least one pair of angle iron type stringers 56 that are affixed thereto by any suitable means. The support structure is completed by actuating means 46 that are also attached to the trolley members 24, which means is adapted to raise and lower pusher units 48 that are positioned across the conveyor as may best be seen in FIGS. 3 and 4. These units 48, described hereinbelow, are supported on a substantially vertically movable crossing structure that includes vertical and stationary end members 18 that are fixed together by channel-like cross pieces 20. This structure is attached top and bottom to actuating means 46. The upper attachment is effected by means of L-shaped plate 58 that is slotted as at 60 to accept piston rod 62 and which is affixed to the upper extremities of end members 18. Affixed opposite thereto are bearing mounts 64 from which second pivotal end members 18A are mounted by means of pintle 66. Opposed ones of these are interconnected by channel members (cross pieces) 20A in like fashion to those mentioned above.

The interengagement between L-shaped plates 58 and piston rods 62 is maintained loosely by means of the elongated slot 60. This affords a freedom of movement to the various structural members that will enable same to compensate (contract and expand) for temperature changes. Rigid connections at this point could tend to produce binding between the wheels 26 and rails 30 in the event temperatures or temperature changes of the various apparatus parts varied significantly. Note, however, that the lower extremities of piston rods 62 are rigidly affixed to end members 18 by means of blocks 67 and supporting gusset plates 68.

The blocks 66 also have attached to their bottom faces spacers 70 that may support either vertical plates 72 (FIG. 1) or be adapted to mount actuating means 74 (FIG. 4). Vertical plates 72 support bars 76 that may be affixed to pivotal end member 18A in any one of a plurality of positions to thereby space a front row of pusher units 48 a predetermined distance from the back row of such units. In one preferred embodiment the front row of pusher units may be spaced either 5 or 6 inches from the rear row. Accordingly, ware being moved by conveyor 12 on either 5 or 6 inch centers may be realigned with this apparatus.

Similarly, this apparatus makes it possible to respace ware that is stacked on the conveyor on 4 inch centers or less by use of the embodiment shown in FIG. 4. Such provides for the pivotal movement of the front row of pusher units with actuating means 74 that is fixed to the spacers 70. In either instance the bars 76 or the actuators 74 are connected to pivotal end members 18A through frontal plates 78 and pillow blocks 80. End members 18A are pivotally mounted to bearing mounts 64 and are oscillated between rearward and forward positions by fluid cylinders or actuating means 74.

As indicated cross pieces 20, 20A on both stationary and pivotal end members 18, 18A have affixed thereto a plurality of pusher units 48. Such units are adapted to engage and orient two rows of ware simultaneously. In some instances, it, of course, might be equally advantageous to use only a single row of pusher units or to enlarge the frame assembly 14 to accommodate three or more rows thereof. Similarly, the number of pusher units 48 that are positioned transversely of conveyor 12 along cross pieces 20, 20A may be varied to accommodate the number of bottles per row that are stacked on the conveyor 12.

Each pusher unit 48 is comprised of a pusher plate 82 supported on the terminal ends of two slidable rods 84.

These rods are in turn supported for vertical sliding movement in bearing mounts 86 by means of stop collars 88 and the bearing mounts are securely held in place by face plates 90.

It further should be noted that each pusher unit is a wholly separate arrangement which facilitates assembly and removal thereof from the cross pieces 20, 20A. Furthermore, dual rod 84 arrangement is employed to: (1) accommodate the lifting of plates 82 in the event such engage a bottle on the downward movement of the frame and (2) to prevent binding in the event of such lifting. Likewise, due to plate spacing and their angled sides, the size of the notches 92 created between plates 82 accommodates various bottle sizes and a 40° angle of entry of such notches is preferred to assist in bottle "roll in". Another feature of units 48 is the inclusion of shock absorbers 94 which may take any suitable form, for example, that described in my prior referenced application.

These, of course, reduce noise and vibration if a pusher plate abuts ware in an improper relationship thereafter rides off such ware and falls to its lowermost position.

As indicated hereinabove the frame 14 has positioned thereon several support plates 52. Each of these includes an elongated slot 96 that provides for the adjustable positioning of an indicator plate 98. This plate 98 is adapted to support either a light or light sensitive source (not shown) that will sense the presence of ware moving with the conveyor 12. When that presence is sensed the electronics of the system activate the apparatus. Accordingly, in operation when, for example, a photoelectric cell mounted on plate 98, or some other suitable sensing means, detects the presence of the first ware row at a designated relationship with respect to the retracted position of pusher units 48 downward movement of such units is initiated so that pusher plates 82 are positioned adjacent conveyor 12 and approximately behind the ware in each row (FIGS. 3 and 5). Subsequent to such downward movement due to the activation of fluid cylinders 46, a micro-switch (not shown) triggers actuating means (fluid cylinders) 100 and the support structure 16 is moved forwardly in the direction of the movement of conveyor 12. Accordingly, the ware is engaged by pusher plates 82 and in particular by the V-notches 92 formed therebetween (FIGS. 4 and 5). The ware by moving into these notches is oriented longitudinally on conveyor 12 and due to the forward movement of the assembly is oriented laterally thereon.

After a predetermined degree of forward movement, as may be sensed by a micro-switch (not shown) but mounted on the frame to adjustable plate 104, fluid cylinders 46 are again activated, this time to withdraw or retract pusher units 48 to a position above and clear of the ware. Then, after a dwell period cylinders 100 withdraw the assembly to its initial start position and another micro-switch (not shown) but mounted on plate 106 activates the electronic system for a new cycle of operation.

In the event that respacing of ware is to be effected by means of the embodiment shown in FIG. 4 fluid cylinders 74 are activated during the forward movement of the support structure 16 thus pivoting end members 20A from the vertical to their forward most position. Likewise, after retraction of the pusher units 48 these same fluid cylinders 74 withdraw end members 20A and the front pusher unit row to that substantially vertical position. Each cylinder activation subsequent to initiation of the cycle is preferably accomplished by micro-switches that are mechanically activated by the moving hardware elements. Other systems may, however, function equally well. After alignment, as is above described, the ware continues to move forward with conveyor 12 and again its presence is sensed when such is in a proper position for "pick-up" by any suitable means.

As is also indicated above, and as is shown in FIG. 6, the device may be easily modified for ware transfer purposes. Typical of such transfer functions is the movement of stacked ware on an oven conveyor 12, across a series of dead plates 108 to a single line conveyor 110. This type of transfer is usually accomplished using an unscrambler. However, in situations where uniformity in ware condition, for example temperature, is important to further downstream processing, unscramblers may not provide the positive transfer necessary.

This device can afford a user such positive effects by removing the rear row of pusher units 48. Likewise, the pusher plates 82 are then replaced by push bars 112 on the pivotal front row of pusher units. Furthermore, it may be necessary to change the respacing actuating means 74 to provide sufficient stroke capability to push the ware across the dead plates 108. Otherwise, the operation of the apparatus as above described remains essentially the same.

From the foregoing, it should be noted that an improved apparatus for orienting or transferring ware is contemplated and described here. Such may, of course, be used in a variety of ways and with minor modifications depending upon the circumstances encountered without departing from the gist of the concepts herewith disclosed as well as those which may be considered inherent.

I claim:

1. An orientation mechanism adapted to accurately align a plurality of moving and upstanding articles simultaneously and including:

a frame having portions above and transverse of a conveyor, a support structure mounted on said frame, said structure having at least one cross piece extending laterally of said conveyor approximately perpendicular to the direction of movement of such conveyor;

first actuating means connected to said frame and adapted to reciprocate said support structure longitudinally in the direction of and counter to the direction of movement of said conveyor;

second actuating means mounted on said support structure in engagement with the cross piece, said engagement therewith being such that the activation of said second means moves said cross piece approximately vertically to a retracted position above and adjacent said upstanding articles;

a plurality of pusher units positioned on said cross piece for engagement with said articles and including bearing mounts with freely slidable positioned rods extending therethrough, separate pusher plates fixedly attached to the lower extremities of at least two each of said rods; and wherein said units are arranged in a plurality of parallel rows so that each cyclical movement of the mechanism will orient a plurality of rows of upstanding articles on the conveyor, and the said units in at least one of said parallel rows is pivotally mounted with respect to said support structure.

2. An orientation mechanism according to claim 1 wherein resilient means buffer the downward movement of said rods and the engagement of same with said cross piece.

3. A transfer device adapted to simultaneously move a plurality of articles from one conveyor to another conveyor and including:
- a frame having portions above and transverse of a conveyor, a support structure mounted on said frame, said structure having at least one cross piece extending laterally of said conveyor approximately perpendicular to the direction of movement of such conveyor;
- first actuating means connected to said frame and adapted to reciprocate said support structure longitudinally in the direction of and counter to the direction of movement of said conveyor;
- second actuating means mounted on said support structure in engagement with the cross piece, said engagement therewith being such that the activation of said second means moves said cross piece approximately vertically to a retracted position above and adjacent said upstanding articles;
- a plurality of pusher units positioned on said cross piece for engagement with said articles and including bearing mounts with freely slidable positioned rods extending therethrough, separate pusher plates fixedly attached to the lower extremities of at least two each of said rods; and wherein said units are arranged in a plurality of parallel rows so that each cyclical movement of the mechanism will orient a plurality of rows of upstanding articles on the conveyor, and the said units in at least one of said two parallel rows traversing said conveyor is pivotally mounted with respect to said support structure; and,
- third actuating means is affixed to the pivotal ones of said units to oscillate said one such parallel row about its axis of pivotal attachment to the support structure.

4. An orientation mechanism according to claim 3 wherein resilient means buffer the downward movement of said rods and the engagement of same with said cross piece.

* * * * *